Aug. 13, 1929.  C. O. PETTERSSON  1,724,219
REFRIGERATING SYSTEM AND CONTROLLING APPARATUS THEREFOR
Filed Jan. 24, 1927    4 Sheets-Sheet 1
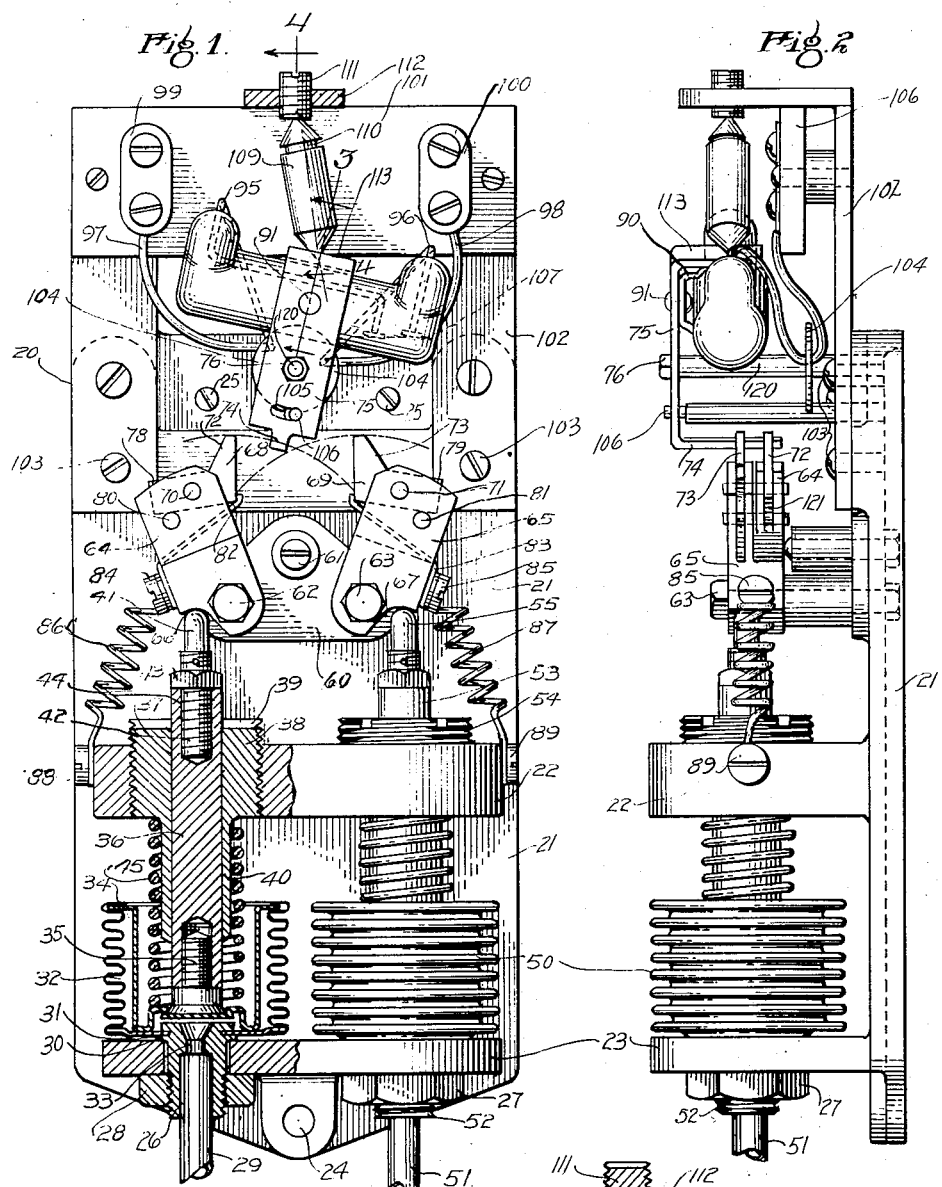
Inventor
Clarence O. Pettersson
By Frank M. Slough
His Attorney

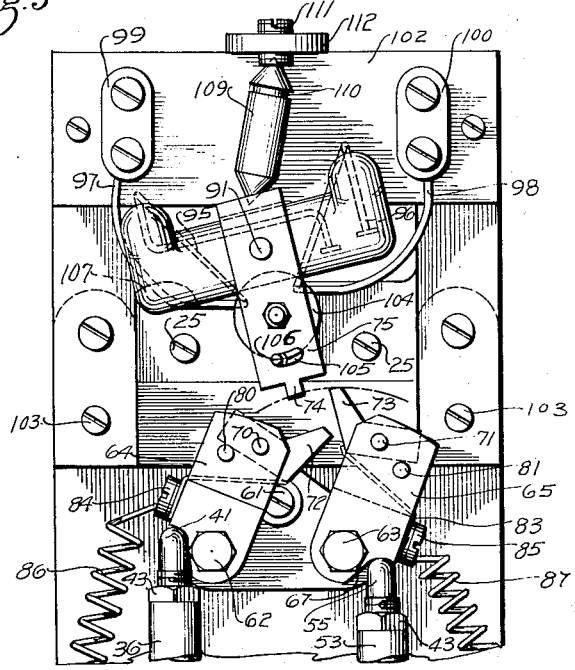
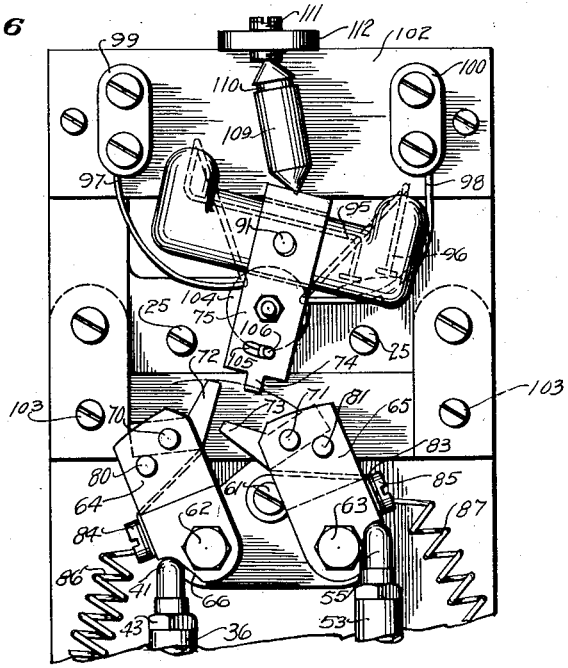

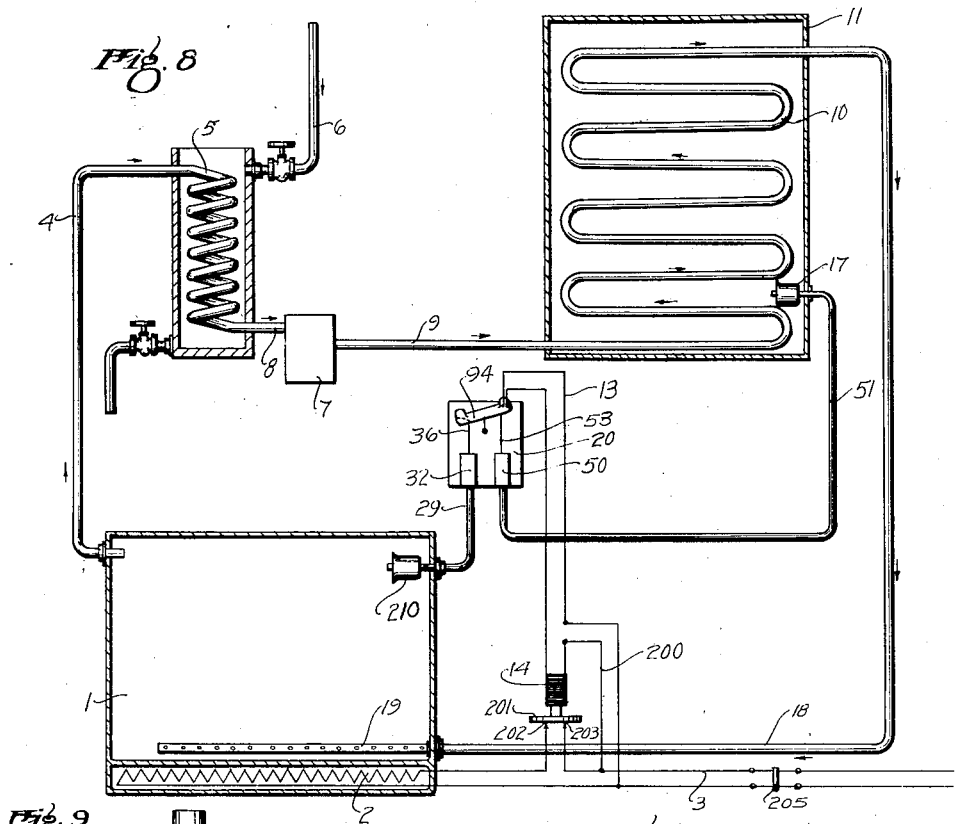
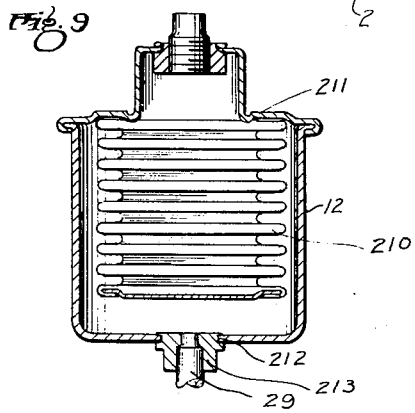
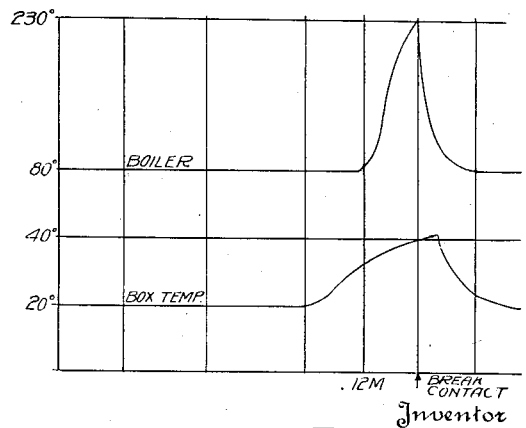

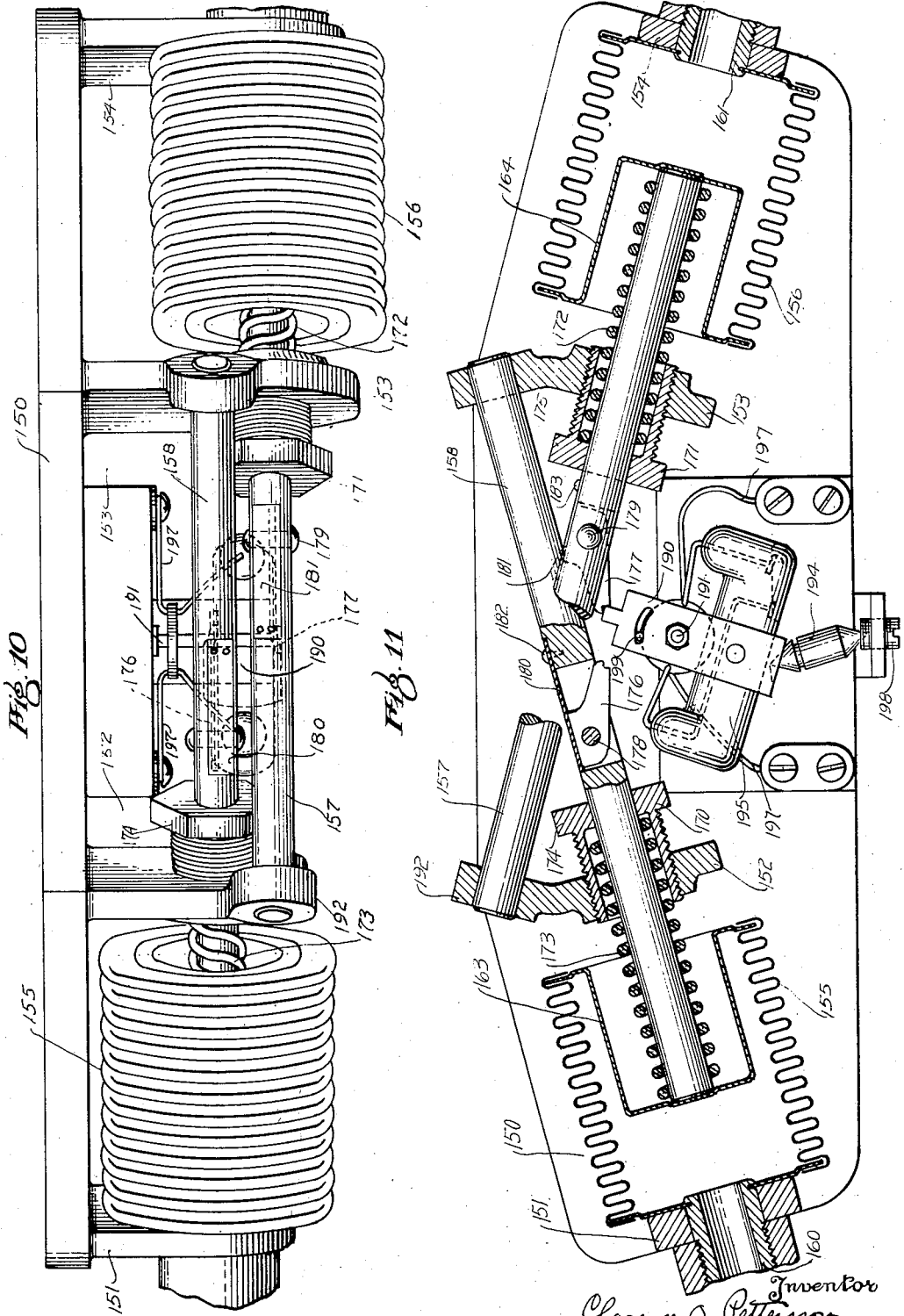

Patented Aug. 13, 1929.

1,724,219

UNITED STATES PATENT OFFICE.

CLARENCE O. PETTERSSON, OF CLEVELAND, OHIO.

REFRIGERATING SYSTEM AND CONTROLLING APPARATUS THEREFOR.

Application filed January 24, 1927. Serial No. 163,121.

My invention relates to improvements in refrigeration system and controlling mechanism therefor, and more particularly relates to refrigeration systems of the type known as absorption systems and mechanism for automatically controlling the refrigeration process according to the needs of the system.

An object of my invention is to provide a refrigeration system wherein the operative process will be performed periodically in sequence as is required for most efficient regulation of the desired temperature to be achieved in the system.

Another object of my invention is to provide a controlling mechanism for the absorption type of refrigeration system, which will be positive in operation and which will accomplish such a control over the elements of the system as will achieve highly efficient refrigeration.

Another object of my invention is to provide, as a replaceable unit, controlling mechanism for the absorption type of refrigeration system which will be positive in operation and adjustable to perform its controlling function to regulate the temperature achieved in the system to a desired temperature value.

These and other objects of my invention and the invention itself will become apparent from reference to the following description of certain embodiments of my invention and in which description reference will be had to the accompanying drawings illustrating the said embodiments and forming a part of this specification.

Referring to the drawings:

Fig. 1 shows a front elevational view of an embodiment of my invention, some of the parts of which being broken away and shown in section;

Fig. 2 shows a side elevational view of the same;

Fig. 3 shows a fragmentary transverse sectional view taken on the line 4—4 of Fig. 1;

Fig. 4 shows a fragmentary vertical sectional view taken on the line 4—4 of Fig. 1;

Figs. 5 and 6 show fragmentary elevational view of certain opposed operative positions of the foregoing embodiment;

Fig. 7 shows a graphic chart illustrating the various heat curves for effecting the operative position of the said embodiment;

Fig. 8 shows a diagrammatic view of an artificial refrigeration machine embodying my invention;

Fig. 9 shows a sectional view of one of the details employed in the foregoing; and Figs. 10 and 11 are top plan and transverse sectional views respectively of a modified embodiment of my invention.

Referring to Figs. 1 to 8 inclusive of the drawings, in all of which like parts are designated by like reference characters in which figures I have illustrated one embodiment of my invention, preferably comprising an automatically controlled electric circuit maker and breaker mechanism, generally indicated by the reference numeral 20. Said circuit maker and breaker is adapted to be actuated by fluid pressure communicated to it from a refrigerator machine, preferably of the well known absorption type machine illustrated diagrammatically in Fig. 8 to automatically control the temperatures of the said machine.

Preferably the circuit maker and breaker mechanism 20 comprises a base 21 of a metal casting having a pair of laterally projecting aligned plates 22 and 23 disposed one above the other and cast integrally with the base, to provide a rigid support. Bores 24 and screws 25 are provided in the base and adapted to receive screws therethrough for securing the mechanism 20 to a supporting surface.

Spaced apertures are provided in the plate 23 into which hollow nipples 26 and 52 project having threaded outer surfaces. Said nipples are secured to the plate 23 by nuts 28 and 27 and are adapted to receive pressure communicated through tubes 29 and 51 connected with a remote portion of the refrigeration machine. The upper end of the nipples are flanged at 30 and provided with an upset reduced portion 31 for supporting two corrugated metallic diaphragms 32 and 50. A reduced bore 33 is formed in the upper portion of the nipples for communicating fluid pressures from the tubes 29 and 51 to the interior of the diaphragms. Both diaphragms and their associated parts being alike in construction and operation the construction of but one of them will be described in detail.

The top wall 34 of the diaphragm 32 is preferably of cup-shaped formation and disposed between the corrugated side walls of the same and is rigidly connected by a machine screw 35 to a plunger 36 projected into the diaphragm top wall. Said plunger is adapted to be reciprocated in a bore 37 of a boss 38 which boss is adapted to be threaded into a threaded aperture 39 of the plate 22. Aperture 39 is disposed in axial alignment with the aperture in the plate 23 but of relatively large size. The boss 38 is provided with a depending guide portion 40 for the plunger 36 to reciprocate in. A contact member having a rounded contacting portion 41 at its topmost extremity and a threaded lower portion 42 which lower portion is threaded into a suitable bore 44 in the upper face of the plunger and adjustably secured thereon by means of an adjusting nut 43. A coiled spring 45 is coiled about the depending portion 40 of the boss 38 and the plunger 36 and is compressed between the bottom face of the boss and the bottom wall of the cup-shaped portion 34 of the diaphragm to normally retain the plunger and the contact member 41 in its downmost inoperative position as shown in Fig. 1 of the drawings.

The second diaphragm 50, heretofore referred to, having communication with the tube 51 is carried by the nipple 52 on the plate 23 to the right of the diaphragm 32. Diaphragm 50 is provided with a plunger 53 reciprocable in a boss 54 and carries a contact element 55 upon its upper end, said contact element is secured to the plunger 53 in a manner the same as is the contact element 41 carried on the plunger 36. Said boss 54 is threaded into a threaded aperture in the plate 22 identical with the manner in which the boss 38 is carried in the aperture 39. A plate 60 is carried on the base 21 at a point intermediate its ends and secured thereon by a screw 61 and bolts 62 and 63, said bolts also project laterally of the plate 60 to provide pivots for a pair of arms 64 and 65 pivoted thereon. Said arms are provided with curved portions 66 and 67 formed on their lower faces, which portions are adapted to be engaged by the contact members 41 and 55 when the said contact members are reciprocated on the plunger into contact with these portions and for swinging either of the arms 64 and/or 65 depending upon which of the said contact members are being reciprocated.

Triggers 68 and 69 are pivoted at 70 and 71 to the arms 64 and 65 respectively. Said triggers have upstanding contacting portions 72 and 73 adapted to engage a trigger finger 74 carried by an arm 75, which arm is pivoted at 76 on a pin 120 carried by the base 21. The arms 64 and 65 are provided with a slot 121 in their upper portions into which the triggers 68 and 69 pivot, the lower portion 78 and 79 of said triggers are disposed within the said groove and adapted to engage transverse pins 80 and 81, which pins provide a stop for said trigger arms during the working stroke of the arms 64 and 65. Flat springs 82 and 83 are secured by springs 84 and 85 to the arms 64 and 65 and normally compress the triggers 68 and 69 into engagement with the stop pins 80 and 81. Springs 82 and 83 which are carried by the arms 64 and 65, respectively, permit the arms to return to normal position without effecting the position of the bulb once it has been set into one of its operative positions by virtue of the triggers on their return travel engaging the finger 74 and are tilted downwardly by such contact against the tension of the springs 82 and 83 depending upon which of the triggers and levers are returning to normal position. Normal position of the arms is effected by the effort of the springs 86 and 87 when the diaphragms 32 or 50 are not in expanded position. Coil springs 86 and 87 are secured by screws 84 and 85 to the arms 64 and 65 with their free ends anchored to the opposite ends of the plate 22 by machine screws 88 and 89.

A substantially U-shaped spring clip 90 as best shown in Fig. 3, preferably riveted at 91 to the arm 75, the arms 92 and 93 of the clip are curved to conform to a closed bulb 94 of glass or like material snapped therein, and retained therein by virtue of the inherent resiliency of the said clip. Electrodes 95 and 96 project into the said bulb, the free ends of which terminate at a point in close proximity to each other adjacent one end of the bulb. A body of conducting liquid such as mercury 107 is located in the bulb 94 and is free to travel from end to end thereof when the bulb is tilted in either direction from a horizontal position. Conductors 97 and 98 provide an electric connection between the electrodes and a source of electric current 3, as shown in Fig. 8 of the drawings, which will hereinafter be described in detail. The conductors are passed through eyelets in a plate 104 pivoted on the pin 120 and are secured to the terminals 99 and 100 carried by an extension frame 101 and insulated therefrom by the insulating plates 102 extending upwardly from the base 21, and secured thereto by screws 103. Conductors 97 and 98 provide a circuit 13, as best shown in Fig. 8 of the drawings, and provides a connection between the electrodes and an electric service source line 3.

An arcuate slot 105 is formed adjacent the lower end of the arm 75 above the finger 74 into which a reduced portion of a pin 106 projects, which is adapted to limit the swinging movement of the arm 75 when tripped by the trigger 72 or 73, said pin is secured on the base 21 to the rear of the arm 75 and below the pivot pin 120. A coil spring 108 is carried in a bored cylindrical housing 109 and adapted to constantly exert an outward spring pressure on a reduced portion of a plunger 110, which reduced portion is projected into the bore of the cylindrical housing 109, into contact with an adjusting screw 111, as best shown in Fig. 4 of the drawings. Said adjusting screw is disposed on a transverse extension 112 of the frame extension 101 and adapted when turned in either direction to vary the tension of the spring 108 and accordingly varies the pressure in the cylindrical housing 109 engaging a transverse portion 113 of the arm 75. This mechanism retains the arm 75 and the bulb 94 in one of its tilted positions and prevents the said bulb from remaining in a horizontal plane. Said adjusting screw 111 and transverse frame arm 113 are provided with recesses to receive the pointed ends 130 and 131 of the cylindrical housing 109 and the plunger 110, respectively, which recess, due to the spring pressure of the spring 108 tending to force the housing and plunger away from each other, prevents the same from disengaging itself from between the screw end and the transverse arm.

Operation of the above described embodiment of my invention in connection with an absorption type refrigeration machine is as follows:

Assuming the switch to be in the position as indicated in Figs. 5 and 8 of the drawings wherein the circuit 13 is broken, by virtue of the mercury having thereby flowed to the end of the bulb opposite to the end wherein the electrodes are disposed. Deenergizing the electro-magnet permits the core carrying the contact arm 201 to fall by gravity, or by spring pressure not shown, into engagement with two contacts 202 and 203, as best shown in Fig. 8, closing the circuit to an electrical heater 2 disposed beneath a generator-absorber which may be partly filled with an aqua-ammonia solution. Heating of the generator-absorber by the heater causes the ammonia to be distilled off in a gaseous state whereby it will pass upwardly through a take off pipe 4 and downwardly through the coils 5 of a condenser where the ammonia is liquefied and flowed through a pipe 8 into a trap or receiver 7 from where it then flows into an expansion coil 10 in a refrigerator box 11. Said ammonia liquid will expand in the said expansion coils in a gaseous state and while in its gaseous state the ammonia will absorbe the surrounding heat. Heat absorbed ammonia gas will return through the return pipe 18 into the base of the boiler and through apertures in the pipe 19 disposed in the base of the generator wherein it will be reabsorbed by the liquid remaining in the generator-absorber. When the heat in the generator-absorber reaches a temperature of approximately 230 degrees Fahrenheit as indicated by the heat curve in the chart of Fig. 7 of the drawings, substantially all of the ammonia gas has been distilled off leaving a residue in the generator-absorber of a weak ammonia liquid or water.

A fluid highly responsive to temperature changes is carried in a bellows 210 disposed in the top portion of the generator-absorber and the rise of temperature in the generator-absorber to 230 degrees causes expansion of the fluid in the bellows 210 which in turn communicates motion to move a fluid which fills the tube 29, which fluid is not effected by normal temperatures, and forces some of this fluid into the bellows 32 expanding the same. Expansion of the bellows 32 reciprocates the plunger 36 upwardly in its bearing rocking the bulb 94 on its pivot through the agency of the lever 64 and trigger 72, to a horizontal position, at which time the spring 108 will tilt the bulb downwardly to the right causing the body of mercury to flow to the ring side of the bulb closing contact in the circuit 13 as best shown in Figs. 1 and 6 of the drawings. Closing of the circuit 13 energizes the electro-magnet 14, which circuit 13 receives current from the main circuit line 3 through the leads 200 and breaking circuit to the heater 2. Normally the time required to heat the generator-absorber to a temperature of approximately 230 degrees Fahrenheit is about 45 minutes. However, the return of the ammonia gas with the absorbed heat from the box 11 may take considerable greater time, sometimes consuming a day's time.

After substantially all of the gas has been returned to the generator-absorber and reabsorbed by the weaker liquid contained therein the temperature of the refrigerator box 11 will rise and when it has reached a temperature of substantially 40 degrees Fahrenheit as indicated on the chart of Fig. 7, a fluid highly responsive to temperature changes containing in a bellows 17 disposed within the box 11 will be expanded. The bellows 17 is identical in construction with the bellows 12 and the fluid may be the same as that contained in bellows 12. Expansion of this fluid communicates motion to a liquid filling the tube 51, which liquid like the liquid in tube 29 is not affected by normal temperature. The liquid contained in the tube 51 expands the band 50 reciprocating the plunger upwardly until the contact portion of the plunger engages the pivoted arm 65 pivoting the same to the left until it engages the finger 74 whereby it will swing the bulb 94 to a horizontal position, the spring 108 causing the bulb to tilt to the left as indicated in Fig. 6 of the drawings. The body of mercury in the bulb 94 flows to the left breaking the contact in the circuit 13 and de-energizing the electro-magnet 14 which permits the contact 201 to engage the contact 202 and 203 closing the circuit 3 to the heater 2 whereby another cycle of operation will take place, namely distilling the ammonia, condensing and expanding the same and returning the heat absorbed gas to the generator-absorber. A manual switch 205 is provided in the service line to control the same.

Although I have illustrated and described the switch embodied in Figs. 1 and 6 of the drawings in use in connection with the refrigerator machine, it is to be understood that other embodiments of my switch may be employed of differing constructions from the one just described with substantially the same result being accomplished. Another such a switch, of a like nature, but of a varying construction is illustrated in Figs. 10 and 11 of the drawings and preferably comprises a base plate 150 having laterally projecting plates 151, 152, 153 and 154 adapted to support a pair of diaphragms 155 and 156 tilted towards each other, and a pair of plunger rods 157 and 158. Thimbles 160 and 161 are carried by the plates 151 and 154 respectively and may be connected with the tubes 29 and 51 respectively in a manner similar to their connection with the switch illustrated in Figs. 1 to 6. Each of the bellows is supported by the thimbles, and are provided with a cup-shaped top plate 163 and 164, respectively. Said cup-shaped plates engage one end of the plunger rods 157 and 158.

The plates 152 and 153 are bent on an angle toward each other intermediate their ends and are provided with a pair of apertures. One of said pairs of apertures being substantially the same size, and adapted to provide bearings for the end of the plunger rods, while the other pair of apertures are threaded and adapted to receive threaded collars 170 and 171, which collars are provided with an enlarged bore and a relatively small bore. The upper portion 192 of the plate 152 is disposed parallel with the lower portion of the plate 153 and each are disposed at right angles to the plunger rod 157. The upper bent end 193 of the plate 153 is disposed parallel to the lower portion of the plate 152, each being disposed at right angles to the plunger 158. Said enlarged bore is adapted to receive spring 172 and 173 therein bearing upon the inner wall of the head portion 174 and 175 of the collars. The opposite end of the said coil spring bears against the cup-shaped wall of each of the bellows. The relatively reduced bore of the collar 174 and 175 are adapted to provide bearings for the plunger rods 157 and 158.

Each of the plunger rods is adapted to carry a trigger 176 and 177 pivoted at 178 and 179, respectively. Flat springs 180 and 181 secured at 182 and 183 to the plunger rods are adapted to retain the triggers in the position indicated in Fig. 10 of the drawings. Expansion of the bellows 156, for example, by liquid forced into the same reciprocates the plunger 157 in its bearings against the tension of the spring 172 whereby the trigger 177 will engage an arm 190 pivoted at 191 to the base 150. Continued expansion of the said bellows will cause the arm 190 to swing on its pivot 191 to a horizontal position at which time the spring 194 will cause the bulb 195 carried by the arm 190 to tilt to a position indicated in dotted lines causing a body of mercury contained in the bulb to flow to the position shown in Fig. 9 of the drawings. The lever 190, bulb 195 and associated parts are similar in construction to the corresponding parts of the embodiment of Figs. 1 to 5 and the operation of the same is substantially similar thereto. Conductors 197 are provided to supply electric current from a source to the electrodes in the bulb. A set screw 198 is also provided for adjustment of the tension of the spring 194. A stop pin 199 rides in the slot provided therefor to limit the tiltable arm 190 and bulb 195. The triggers 176 and 177 are adapted on the return of the plungers to normal position to snap past the finger projection of the arm 190 by virtue of the pull of the spring 180 and 181.

The fluid response bellows 210 and 17, Fig. 8, are identical in construction and as best shown in detail in Fig. 9 preferably comprise a cylindrical container 12, an expanding bellows 210 is secured to an end wall 211 of the container. The opposite end of the container is apertured at 212 for the reception of a nipple 213 and the pipe 29 which pipe communicates with the diaphragms 32 and provide a closed system between the bellows 210 and 32 for fluid contained therein.

I do not wish to limit the use of my invention to an absorption type refrigeration system as my invention may be embodied in many other systems wherein temperature control devices are essential.

It will be understood that I do not wish to be limited to the specific operating temperature herein recited. The embodiment above described may be adjusted so that it may be actuated at varying tetmperatures from the temperatures herein given, periodically in sequence as is required to most efficiently regulate the same to the varying conditions to which the system may be subjected.

The switch will not be gradually changed from circuit opened position to closed position but will positively open and/or close the same instantaneously and automatically in regulating the operation of the system, thereby eliminating waste of power and loss of efficiency.

Having thus described my invention in specific embodiments I am aware that nu- merous and extensive departures may be made from the embodiments herein illustrated but without departing from the spirit of my invention.

What I claim is:

1. In a refrigeration system, the combination with a pair of fluid-contained chambers of the system adapted to acquire different temperatures, of a pair of fluid pressure responsive cells, each having a wall adapted to be moved according to the temperature existing in one of said chambers, an electric switch comprising a set of electrical contacts and a movable element for actuating the contacts, said movable element being spring-pressed to either of two alternative switch contact operating positions from any position on either side, respectively, of a mid-position, and means for each movable wall adapted to communicate motion to move the movable element towards a particular one of said alternate switch operating positions, different from the position to which it is movable by movement communicated from the other wall, one of said motion-communicating means adapted to usurp the control of the other comunicating means over said switch operating element to restore said element to its opposite alternate position independently of the position of the said other motion-communicating means.

2. In a refrigeration system, the combination with a pair of fluid-contained chambers of the system adapted to acquire different temperatures, of a pair of fluid pressure responsive cells, each having a wall adapted to be moved according to the temperature existing in one of said chambers, an electric switch comprising a set of electrical contacts, and a movable element for actuating the contacts, said movable element being spring-pressed to either of two alternative switch contact operating positions from any position on either side, respectively, of a mid-position, and means for each movable wall adapted to communicate motion to move the movable element towards a particular one of said alternate switch operating positions, different from the position to which it is movable by movement communicated from the other wall, each of said motion-communicating means adapted to usurp the control of the other comunicating means over said switch operating element to restore said element to its opposite alternate position independently of the position of the said other motion-communicating means.

3. In electrical controlling mechanism for a refrigerating system of the absorption type, the combination with a pair of fluid containing cells each having longitudinally expansible side walls and an end wall, movable responsive to the expansion of the side walls according to the pressure of fluid in the cells, a set of electrical contacts, a member oscillatable to effect operation of the contacts, said contacts adapted to control the heating operations in the system, a pair of levers each when oscillated adapted to effect oscillation of the member, said first lever adapted to effect closing of the contacts of the set, said second lever adapted to effect opening of the contacts of the set, a trigger pivoted on each lever and carried thereby, means for communicating motion between each one of said cell end walls and a different one of said triggers, means to communicate fluid under pressure responsive to the thermal conditions of different parts of the system to the different cells respectively, each of said motion-communicating means adapted to usurp the control of the other communicating means over said switch operating element to restore said element to its opposite alternate position independently of the position of the said other motion-communicating means.

4. In electrical controlling mechanism for a refrigerating system of the absorption type, the combination with a pair of fluid containing cells each having longitudinally expansible side walls and an end wall, movable responsive to the expansion of the side walls according to the pressure of fluid in the cells, a container, a body of mercury disposed within the container, a set of electrical contacts, a member oscillatable to effect operation of the contacts, said contacts being disposed within the container and spaced each from the other, the spaced contacts adapted to be electrically connected by the body of mercury when the container is moved by oscillatory movement of the member, said contacts adapted to control the heating operations in the system, a pair of levers each when oscillated adapted to effect oscillation of the member, said first lever adapted to effect closing of the contacts of the set, said second lever adapted to effect opening of the contacts of the set, a trigger pivoted on each lever and carried thereby, means for communicating motion between each one of said cell end walls and a different one of said triggers, means to communicate fluid under pressure responsive to the thermal conditions of different parts of the system to the different cells respectively, each of said motion-communicating means adapted to usurp the control of the other communicating means over said switch operating element to restore said element to its opposite alternate position independently of the position of the said other motion-communicating means.

5. In an electrical controlling mechanism the combination of a base, a slotted arm pivoted to the base, a glass bulb carried by the arm, a pin carried by the base and projecting into the arm slot, a pair of spaced electrodes within one end of the said bulb, electric conductors leading from the said electrodes, a body of electric current conducting liquid disposed in the said container for controlling an electric circuit between the said electrodes, and a pair of triggers adapted to engage the arm to tilt the bulb, and means responsive to temperature changes to actuate the triggers for periodically tilting the said frame to cause said liquid to be moved relative to said electrodes, said means comprising a pair of plunger rods and a pair of corrugated flexible diaphragms connected to the plunger rods, said slot and pin adapted to limit pivotal movement of the arm.

6. In an electrical controlling mechanism, the combination of a base, an arm pivoted to the base, a glass bulb carried by the arm, a pair of spaced electrodes within one end of the said bulb, electric conductors leading from the said electrodes, a body of electric current conducting liquid disposed in the said container for controlling an electric circuit between the said electrodes, and a pair of triggers adapted to engage the arm to tilt the bulb, and means responsive to temperature changes to actuate the triggers for periodically tilting the said frame to cause said liquid to be moved relative to said electrodes, said means comprising a pair of parallel plunger rods and a pair of corrugated flexible diaphragms connected to the plunger rod.

In testimony whereof I hereunto affix my signature this 8th day of November, 1926.

CLARENCE O. PETTERSSON.